May 3, 1966     F. K. IBRAHIM ETAL     3,249,780

D.C. MOTOR WITH PERMANENT MAGNET STATOR

Filed May 13, 1965

INVENTORS
FAIK K. IBRAHIM
DOMINIC SANTOGROSSI
BERNABE NOCITO
BY Edward H. Loveman

ATTORNEY 3,249,780
D.C. MOTOR WITH PERMANENT
MAGNET STATOR
Faik K. Ibrahim, Los Angeles, Dominic Santogrossi, Tarzana, and Bernabe Nocito, Canoga Park, Calif., assignors to Vernitron Corporation, Farmingdale, N.Y., a corporation of New York
Filed May 13, 1965, Ser. No. 455,524
2 Claims. (Cl. 310—154)

This invention relates to the stator constructions for electric machines and more particularly to a stator construction for a small permanent magnet type of machine.

In the design of certain small permanent magnet electric machines, for example, torque motors used in servomechanisms, it is desirable that the flux leakage be reduced to the smallest amount possible. In the past, these machines have required elaborate shielding in order to prevent the flux leakage from effecting the accuracy and performance of auxiliary magnetic and electromagnetic components, i.e., magnetic compass, synchros, resolvers, pick-offs, etc. Another and perhaps more serious effect of the flux leakage is the decrease in performance of the torque motor. Since the torque produced by the torque motor is proportional to the interaction of the stator permanent magnet flux field and the electromagnetic flux field produced by the armature, the flux leakage even if blocked from effecting auxiliary equipment results in lower efficiency with an accompanying increase in power input.

It is therefore an object of this invention to provide an efficient permanent magnet electric motor.

Another object of this invention is to prevent the permanent magnetic field of a torque motor from magnetically interfering with auxiliary electrical machines.

Another object of this invention is to provide an improved permanent magnet stator construction which minimizes magnetic flux leakage.

These and other objects are achieved in accordance with the principles of the invention by providing means to concentrate substantially all of the magnetic field flow into the region of the armature.

Further objects and advantages of this invention will become apparent and the invention will be better understood by reference to the following description and the accompanying drawings. The features of novelty which characterize this invention will be pointed out with particularity in the claims annexed to and forming a part of this specification.

Figure 1:
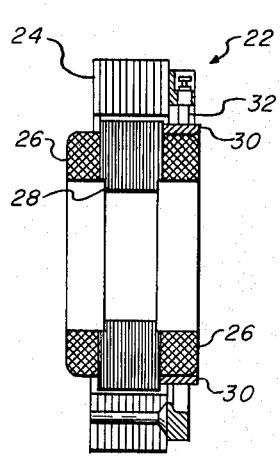
FIG. 1 is a side view of a D.C. permanent magnet torque motor.

Referring to FIG. 1, the permanent magnet torque motor 22 includes a stator assembly 24, armature winding 26, armature stack 28, commutator 30 and brush assembly 32.

When direct current is applied to the permanent magnet torque motor 22, the current flows through the brush assembly 32 to commutator 30 into the armature winding 26 which produces an electromagnetic field. The axis of this electromagnetic field is displaced by the commutator 30, 90° electrically from the field produced by the permanent magnets in the stator assembly 24 as is well known in the prior art. The interaction of the two fields produces the torque and rotation. The torque produced, depends in a great measure on the strength of the permanent magnet field and the electromagnetic field.

Figure 2:
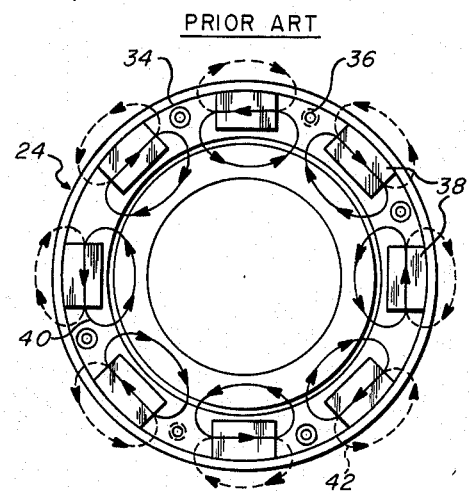
FIG. 2 is a diagram showing a prior art torque motor.

FIG. 2 is representative of a prior art torque motor in which the stator assembly 24 comprises an outer non-magnetic ring 34, a magnetic ring 36 and a plurality of permanent magnets 38 which are located in recesses formed along the outer periphery of the ring 36.

The magnets 38 are polarized such that their North and South poles lie in a plane perpendicular to a radius from the center of the stator as indicated in FIG. 2. The magnetic flux pattern is diagrammatically illustrated by the elliptical lines 40. The magnets 38 are installed into the magnetic ring 36 and this sub-assembly is then inserted into the non-magnetic ring 24. The purpose of the non-magnetic ring 24 is to provide structural rigidity to the assembly as well as to contain the magnetic flux.

Unfortunately, as shown by the elliptical lines 42 in FIG. 2, the flux is not contained by the non-magnetic ring 34. Flux leakage measurements on the external periphery of a given size torque motor indicated a flux density of 500 gauss. Thus, in order to prevent this flux leakage from interfering with electronmagnetic components which cooperate with this prior art torque motor, further and more elaborate shielding must be provided.

Figure 3:
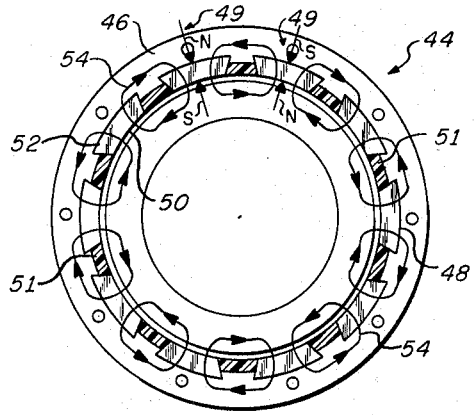
FIG. 3 is a diagram showing the torque motor of a presently preferred embodiment of the invention.

The instant invention which consists of an improved stator assembly 44 shown in FIG. 3, eliminates the need for any type of shielding. The stator assembly 44 comprises a magnetic disc 46 made of high saturation flux density material which in this case is formed of laminations which are stacked and bonded together. The disc 46 may of course be constructed by many other methods known by those skilled in the art. The disc 46 contains slots for providing mechanical support for the permanent magnets 48 which are trapezoidally shaped as shown in FIG. 3 to provide a short magnetic path and thus minimize the reluctance to the magnetic flux. Furthermore, the longest parallel outer faces of the magnets 48 are positioned and secured in the disc using any suitable means, e.g., a steel base epoxy to prevent the magnets from breaking away from the disc. After placing the sub-assembly in an encapsulating mold, it is potted with a non-magnetic compound 51 such that a substantial portion of the distance between the inner face 50 and the outer face 52 of the magnets 48 are magnetically insulated from each other. The stator assembly 44 is then magnetized in a radial direction 49 by means well known in the art.

By magnetizing the magnets 48 in a radial direction the magnetic field or flux (whose flow is diagrammatically indicated at 54) is forced to flow from any one magnet annularly in the magnetic disc 46 to both adjacent magnets. The flux then traverses each of the adjacent magnets in a radial direction, flows across the air gap, through the armature 28, and annularly back to the origin.

Flux field measurements of the given size torque motor which incorporated the invention showed a flux density at the periphery of the motor of 0.5 gauss compared with the density of 500 gauss obtained with the prior art stator shown in FIG. 2.

Figure 4:
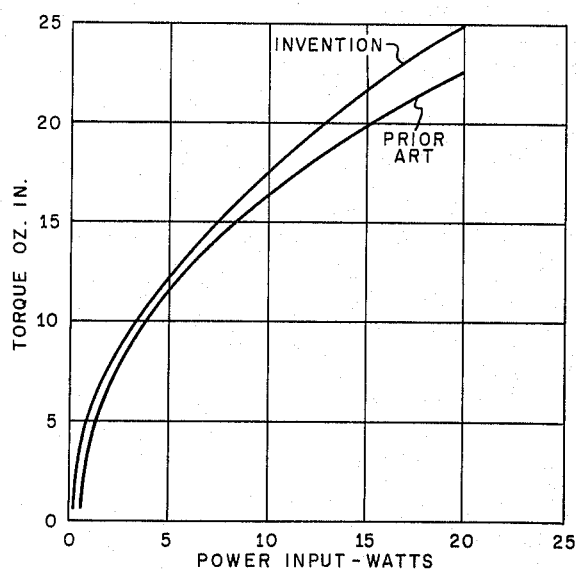
FIG. 4 is a curve illustrating the improvement obtained with the invention.

FIG. 4 illustrates the dramatic improvement which results with the use of the invention. Since torque motors generally operate at stall or near stall conditions, the increase in torque available at stall in a torque motor utilizing the invention as compared to a prior art torque motor is some 2.5 oz. in. The torque to power input ratio is 1.25 for the new motor as compared to 1.1 for the prior art motor.

Although the principles of the invention have been described with respect to a particular type of torque motor, it will be appreciated by those skilled in the art that the principles of the invention may be applied to other electric machines employing a stator having a steady magnetic field.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. A D.C. motor of the type having a stator and an armature adapted to rotate within said stator, said stator comprising
   a continuous ring of high saturation flux density magnetic material,
   a plurality of three sided slots formed within said ring,
   flat permanent magnets shaped to fit in each of said slots,
   means for magnetically insulating a portion of each magnet from a portion of adjacent magnets, each of said magnets being polarized in a radial direction and across the minimum dimension of each magnet whereby each magnet is magnetically linked to each adjacent magnet by at least two paths.

2. Apparatus according to claim 1 wherein each of said permanent magnets has a trapezoidal shape, of which the length of the shortest parallel side is longer than either of the lengths of the two non-parallel sides and wherein the longest parallel side of each of said magnets is in contact with the longest side of said slots, each magnet thereby presenting a minimum magnetic path length to the magnetic flux.

References Cited by the Examiner

UNITED STATES PATENTS

| | | | |
|---|---|---|---|
| 2,475,776 | 7/1949 | Brainard | 310—156 |
| 2,722,617 | 11/1955 | Cluwen | 310—156 |

FOREIGN PATENTS

| | | |
|---|---|---|
| 973,515 | 3/1960 | Germany. |
| 568,864 | 4/1945 | Great Britain. |

MILTON O. HIRSHFIELD, *Primary Examiner.*

DAVID X. SLINEY, *Examiner.*